United States Patent
Ikeda

(10) Patent No.: US 11,831,253 B2
(45) Date of Patent: Nov. 28, 2023

(54) DRIVING CONTROL APPARATUS, DRIVING CONTROL SYSTEM, LENS APPARATUS, DRIVING CONTROL METHOD, AND MEMORY MEDIUM

(71) Applicant: CANON KABUSHIKI KAISHA, Tokyo (JP)

(72) Inventor: Takahiro Ikeda, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 426 days.

(21) Appl. No.: 17/114,945

(22) Filed: Dec. 8, 2020

(65) Prior Publication Data
US 2021/0184600 A1 Jun. 17, 2021

(30) Foreign Application Priority Data
Dec. 12, 2019 (JP) .................. 2019-224307

(51) Int. Cl.
*H02N 2/00* (2006.01)
*G03B 13/34* (2021.01)
*G02B 7/04* (2021.01)

(52) U.S. Cl.
CPC ............... *H02N 2/001* (2013.01); *G02B 7/04* (2013.01); *G03B 13/34* (2013.01)

(58) Field of Classification Search
CPC .......... H02N 2/001; H02N 2/062; G02B 7/04; G02B 7/08; G02B 7/09; G02B 7/102; G03B 13/34; G03B 2205/0046; G03B 2205/0061; G03B 5/00; G03B 3/10
See application file for complete search history.

(56) References Cited

U.S. PATENT DOCUMENTS

| 6,635,977 B2 * | 10/2003 | Kataoka .................. H02N 2/142 310/317 |
| 7,932,950 B2 | 4/2011 | Yamazaki |
| 2015/0146080 A1 | 5/2015 | Morita |

(Continued)

FOREIGN PATENT DOCUMENTS

| CN | 101126833 A | 2/2008 |
| JP | 2013171239 A | 9/2013 |

(Continued)

OTHER PUBLICATIONS

Office Action issued in Chinese Appln. No. 202011460671.8 dated Apr. 21, 2023. English translation provided.

(Continued)

*Primary Examiner* — Emily P Pham
(74) *Attorney, Agent, or Firm* — ROSSI, KIMMS & McDOWELL LLP

(57) ABSTRACT

A driving control apparatus controls an actuator that relatively moves a vibrator and a contact body contacting the vibrator, the vibrator being made to generate vibration by applying a first signal and a second signal having a phase difference. The driving control apparatus includes at least one processor or circuit configured to execute a plurality of tasks including a first determining task configured to determine the phase difference, and a second determining task configured to determine a voltage amplitude of power supplied to the actuator so that the voltage amplitude decreases as an absolute value of the phase difference decreases.

19 Claims, 14 Drawing Sheets

(56) References Cited

U.S. PATENT DOCUMENTS

| 2016/0373630 | A1 | 12/2016 | Onuma |
| 2017/0017137 | A1 | 1/2017 | Morita |
| 2017/0194879 | A1* | 7/2017 | Yamanaka ............. H02N 2/008 |
| 2020/0106372 | A1* | 4/2020 | Sumioka ................ H02N 2/026 |

FOREIGN PATENT DOCUMENTS

| JP | 2013235044 A | 11/2013 |
| JP | 2014153497 A | 8/2014 |

OTHER PUBLICATIONS

Office Action issued in Chinese Application No. 202011460671.8 dated Oct. 17, 2022. English translation provided.

* cited by examiner

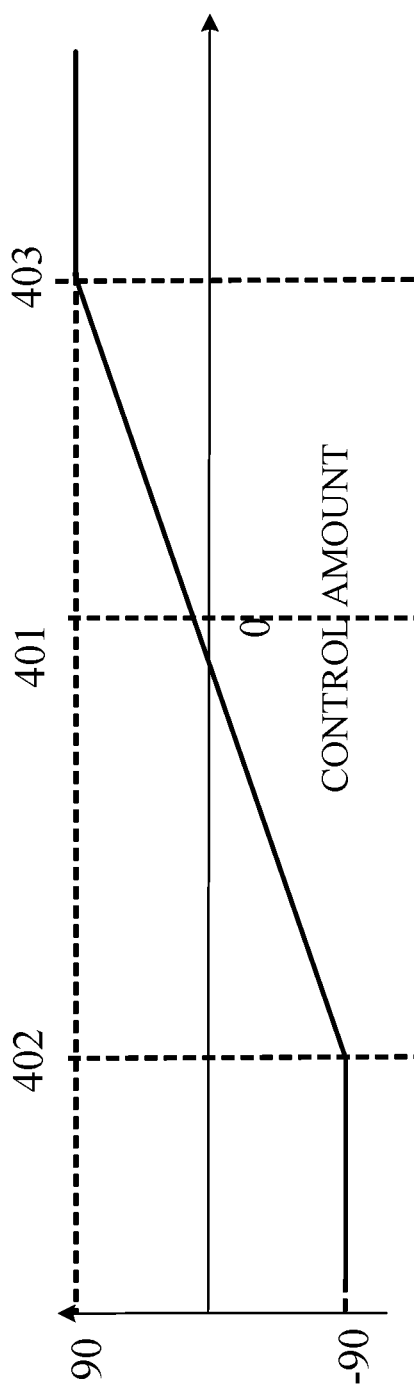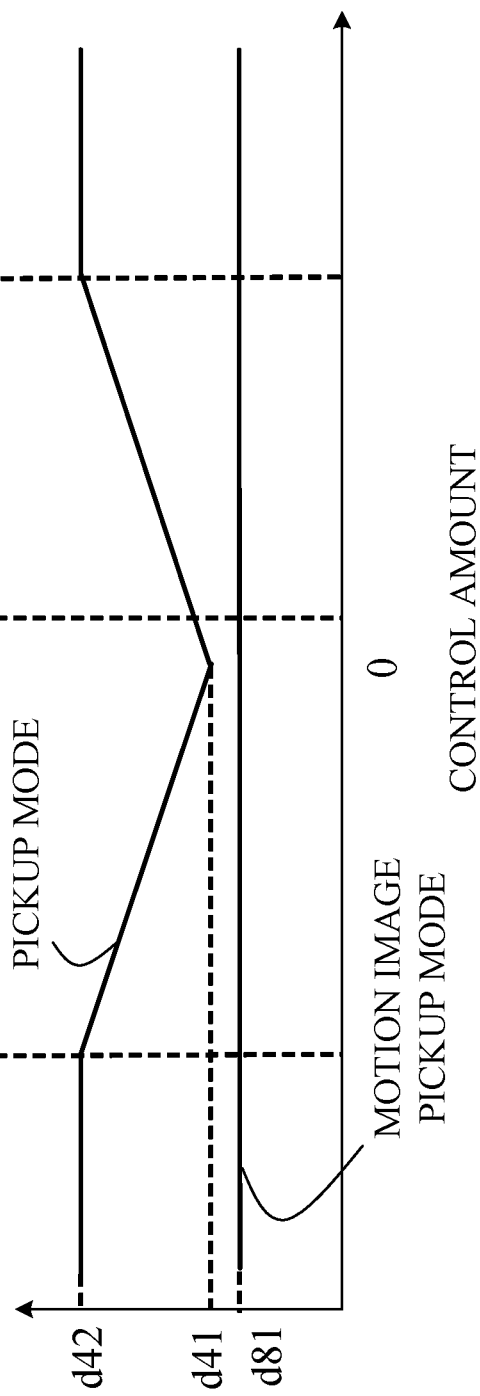
FIG. 8A
FIG. 8B

DRIVING CONTROL APPARATUS, DRIVING CONTROL SYSTEM, LENS APPARATUS, DRIVING CONTROL METHOD, AND MEMORY MEDIUM

BACKGROUND OF THE INVENTION

Field of the Invention

The present invention relates to a driving control apparatus, a driving control system, a lens apparatus, a driving control method, and a memory medium.

Description of the Related Art

A vibration actuator includes a vibrator that is made to generate vibration such as an elliptic motion by applying a two-phase frequency signal having a phase difference, and that is relatively moved with a contact body which contacts the vibrator. As methods for controlling driving of the vibration actuator, methods are known of a frequency control that changes a frequency of a two-phase frequency signal, and a phase difference control that changes the phase difference of the two-phase frequency signal. The frequency control and the phase difference control are often used to drive the vibration actuator at a high velocity and low velocity, respectively.

Japanese Patent Application Laid-Open No. ("JP") 2014-153497 discloses a lens barrel in which when the phase difference is changed at times of starting driving, of reversing a driving direction, or of stopping the driving, a driving voltage is made lower than that when the vibration wave motor is normally driven, so as to suppress noise at a time of changing the phase difference.

However, in the lens barrel of JP 2014-153497, a ratio between an amplitude of the elliptic motion in a traveling direction and an amplitude of the elliptic motion in a direction vertical to the traveling direction changes according to the phase difference. Thus, as the phase difference decreases, the amplitude in the direction vertical to the traveling direction may relatively increases, and unnecessary vibration may occur. Although the frequency control can suppress vibration in the direction vertical to the traveling direction, power consumption may increase.

SUMMARY OF THE INVENTION

The present invention provides a driving control apparatus, a driving control system, a lens apparatus, a driving control method, and a memory medium each of which can suppress noise and unnecessary vibration and can reduce power consumption, when a vibration actuator is driven at a low velocity.

A driving control apparatus according to one aspect of the present invention controls an actuator that relatively moves a vibrator and a contact body contacting the vibrator, the vibrator being made to generate vibration by applying a first signal and a second signal having a phase difference. The driving control apparatus includes at least one processor or circuit configured to execute a plurality of tasks including a first determining task configured to determine the phase difference, and a second determining task configured to determine a voltage amplitude of power supplied to the actuator so that the voltage amplitude decreases as an absolute value of the phase difference decreases.

A driving control system including the above driving control apparatus, a driving control method corresponding to the above driving control apparatus, and a storage medium storing a computer program that enables a computer to execute each task of the driving control apparatus also constitute another aspect of the present invention.

Further features of the present invention will become apparent from the following description of exemplary embodiments with reference to the attached drawings.

BRIEF DESCRIPTION OF THE DRAWINGS

FIGS. 8A and 8B are diagrams illustrating an example of a relationship between a phase difference and a duty ratio according to the second embodiment.

DESCRIPTION OF THE EMBODIMENTS

Figure 1:
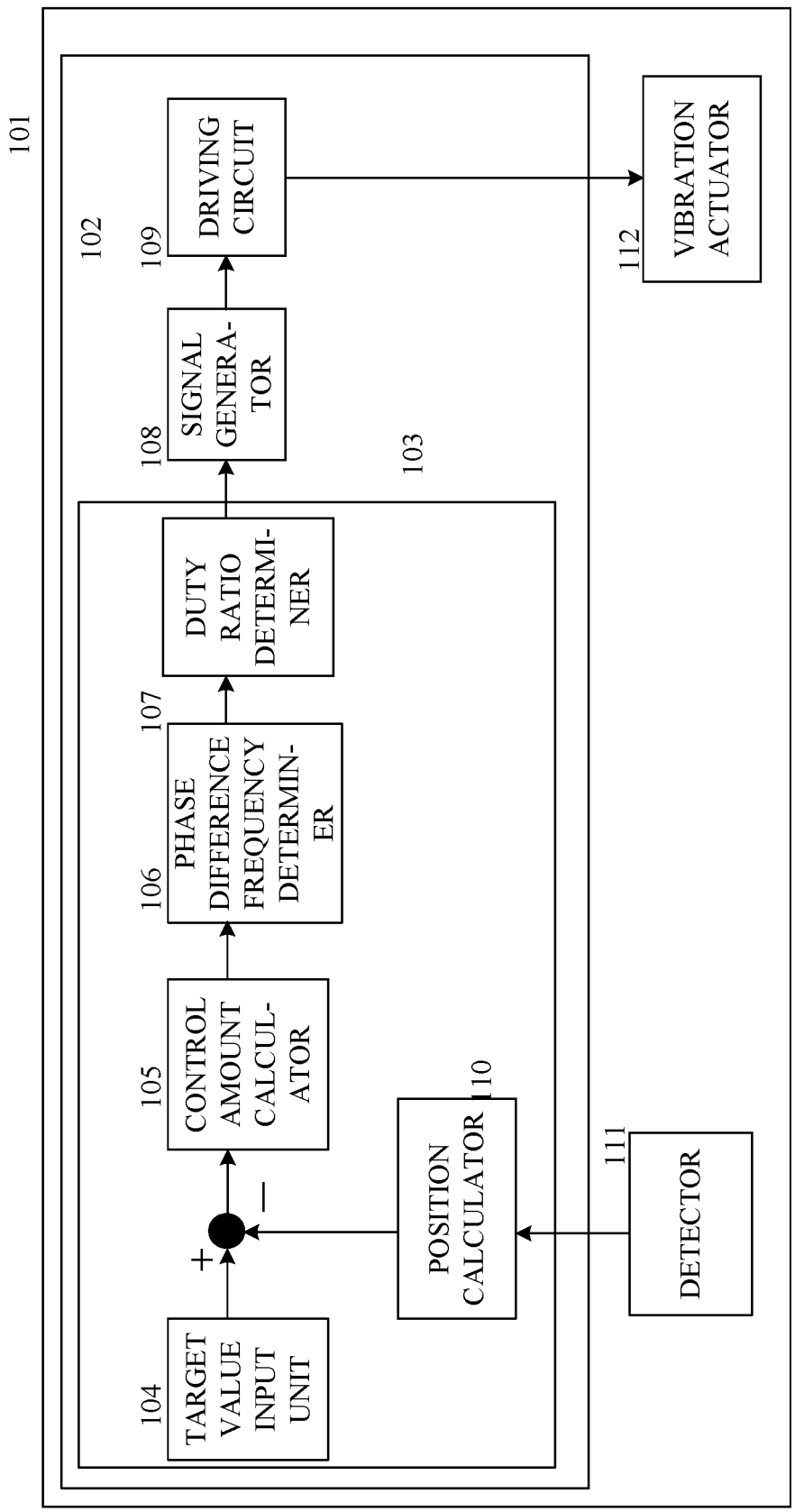
FIG. 1 is a block diagram illustrating a driving control system according to a first embodiment.

Referring now to the accompanying drawings, a description will be given of embodiments according to the present invention. Corresponding elements in respective figures will be designated by the same reference numerals, and a description thereof will be omitted.

First Embodiment

FIG. 1 is a block diagram illustrating a driving control system 101 according to this embodiment. The driving control system 101 includes a driving control apparatus 102, a detector 111, and a vibration actuator 112.

Figure 2:
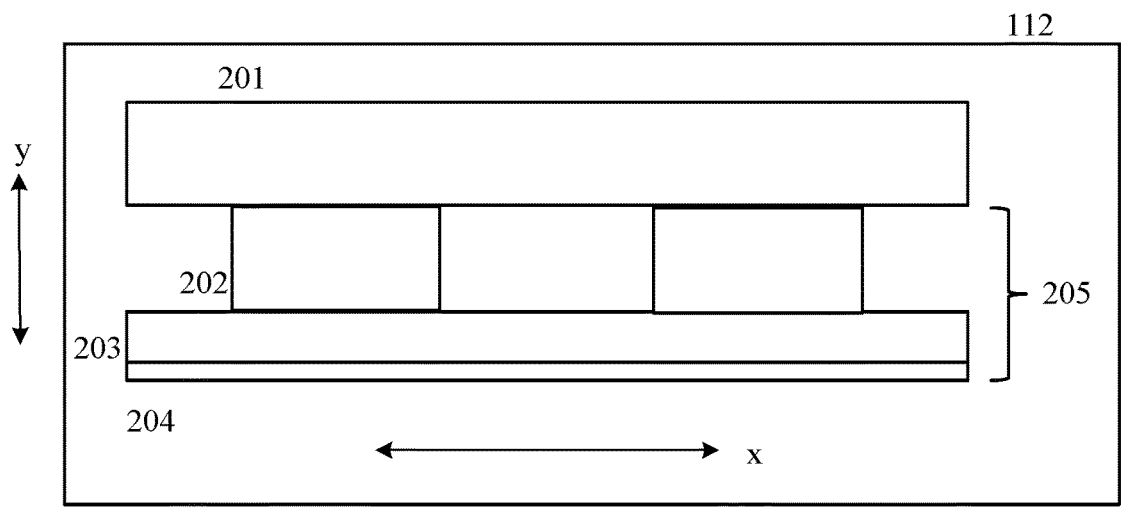
FIG. 2 is a configuration diagram illustrating a vibration actuator according to the first embodiment.

FIG. 2 is a block diagram illustrating the vibration actuator 112 according to this embodiment. The vibration actuator 112 includes a contact body 201 and a vibrator 205. The contact body 201 and the vibrator 205 are pressurized and contact each other. The vibrator 205 includes a metal elastic body or the like 203 having a protrusion 202 and an electromechanical energy conversion element (piezoelectric element) 204 that is bonded to the metal elastic body or the like 203. When a two-phase driving signal, which has a phase difference and changes periodically, is applied to the piezoelectric element 204, the vibration of the elliptic motion is caused. The driving signal is a square wave signal, and a ratio of a pulse width of the square wave to one cycle is called a duty ratio. When the duty ratio increases, a voltage amplitude of power supplied to the vibration actuator 112 increases. When the duty ratio decreases, the voltage amplitude of the power supplied to the vibration actuator 112 decreases.

Figure 3:
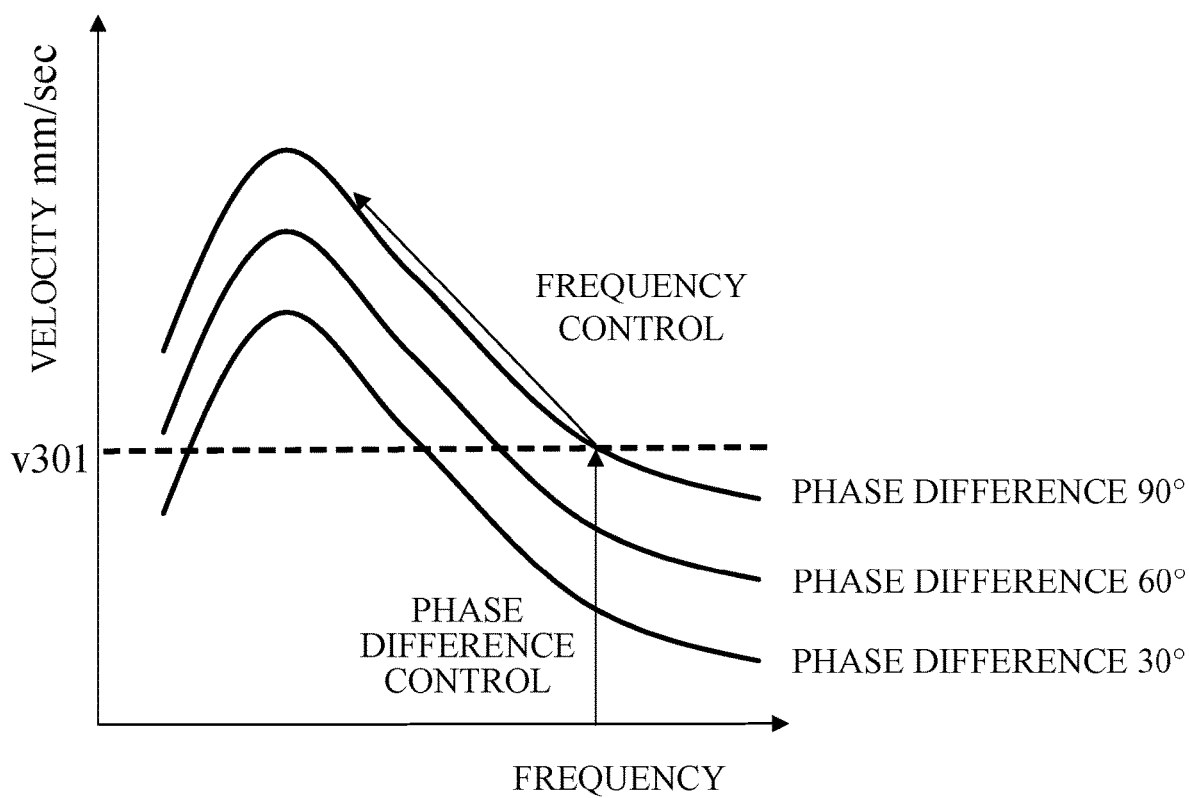
FIG. 3 is a diagram illustrating a relationship between a driving signal for the vibration actuator and a velocity according to the first embodiment.

The vibration actuator 112 is driven at a low velocity by a phase difference control and at a high velocity by a frequency control. FIG. 3 is a diagram illustrating a relationship between the driving signal for the vibration actuator 112 and the velocity. A horizontal axis represents a frequency and a vertical axis represents a velocity. FIG. 3 illustrates three phase differences of 90 degrees, 60 degrees, and 30 degrees. During the phase difference control, the frequency is fixed to a start frequency and the vibration actuator 112 is driven by changing the phase difference. The phase difference is a value having a sign, and the sign indicates a traveling direction of the vibration actuator 112. During the frequency control, the phase difference is fixed and the vibration actuator 112 is driven by changing the frequency from the start frequency.

In this embodiment, in a low velocity area where the velocity is v301 or less, the phase difference control is performed in which the phase difference is −90 degrees to 90 degrees. In a high velocity area where the velocity is v301 or more, the frequency control is performed in which the phase difference is fixed at 90 degrees or −90 degrees. In the frequency control, the phase difference may be set to another value. The voltage amplitude of the electric power supplied to the vibration actuator 112 is adjusted by the ratio of the pulse width, that is, the duty ratio. The voltage amplitude may be adjusted by a method other than a pulse width modulation method. Other than the pulse width modulation method, a linear method may be used as a method for adjusting the voltage amplitude. In the following description, an example is described of adjusting the voltage amplitude by adjusting the duty ratio, but the duty ratio may be simply read as the voltage amplitude.

The vibration actuator 112 moves in an x direction of FIG. 2.

The driving control apparatus 102 includes a controller 103, a signal generator 108, and a driving circuit 109. The detector 111 includes a position sensor configured to detect a position of the vibration actuator 112. The position sensor is an optical encoder including an optical scale having a striped pattern and an optical sensor that receives light emitted from a light emitter and reflected by the optical scale.

The controller 103 includes a CPU and the like, is configured to periodically execute various processing, and is configured to control the frequency, the phase difference, the duty ratio, and the like of the two-phase driving signal (first signal and second signal) applied to the vibration actuator 112. The controller 103 includes a target value input unit 104, a control amount calculator 105, a phase difference frequency determiner 106 as a first determiner, a duty ratio determiner 107 as a second determiner, and a position calculator 110.

The target value input unit 104 is configured to set a target position to which the vibration actuator 112 moves. The target position is an instruction value that changes with time, and is calculated periodically until the vibration actuator 112 moves to a final stop position.

The position calculator 110 is configured to calculate position information on a position of the vibration actuator 112 by using a digital signal that is acquired by an AD converter converting an analog signal output from the detector 111.

The control amount calculator 105 is configured to calculate a control amount by using PID control based on a difference between the target position of the vibration actuator 112 periodically acquired from the target value input unit 104 and a current position of the vibration actuator 112 input from the position calculator 110. P represents proportional control, I represents integral control, and D represents differential control.

The phase difference frequency determiner 106 is configured to determine the frequency and the phase difference of the two-phase driving signal for controlling the driving of the vibration actuator 112, by using the control amount calculated by the control amount calculator 105.

The duty ratio determiner 107 is configured to determine the duty ratio according to the phase difference determined by the phase difference frequency determiner 106. By determining the duty ratio, the voltage amplitude is determined of the power supplied to the vibration actuator 112.

The signal generator 108 is configured to generate the two-phase driving signal based on the frequency, phase difference, and duty ratio each of which are set by the controller 103, and is configured to output the two-phase driving signal to the driving circuit 109.

Since the two-phase driving signal acquired from the signal generator 108 is insufficient for driving the vibration actuator 112, the driving circuit 109 performs voltage amplification and power amplification and applies it to the vibration actuator 112.

Figures 4A, 4B:
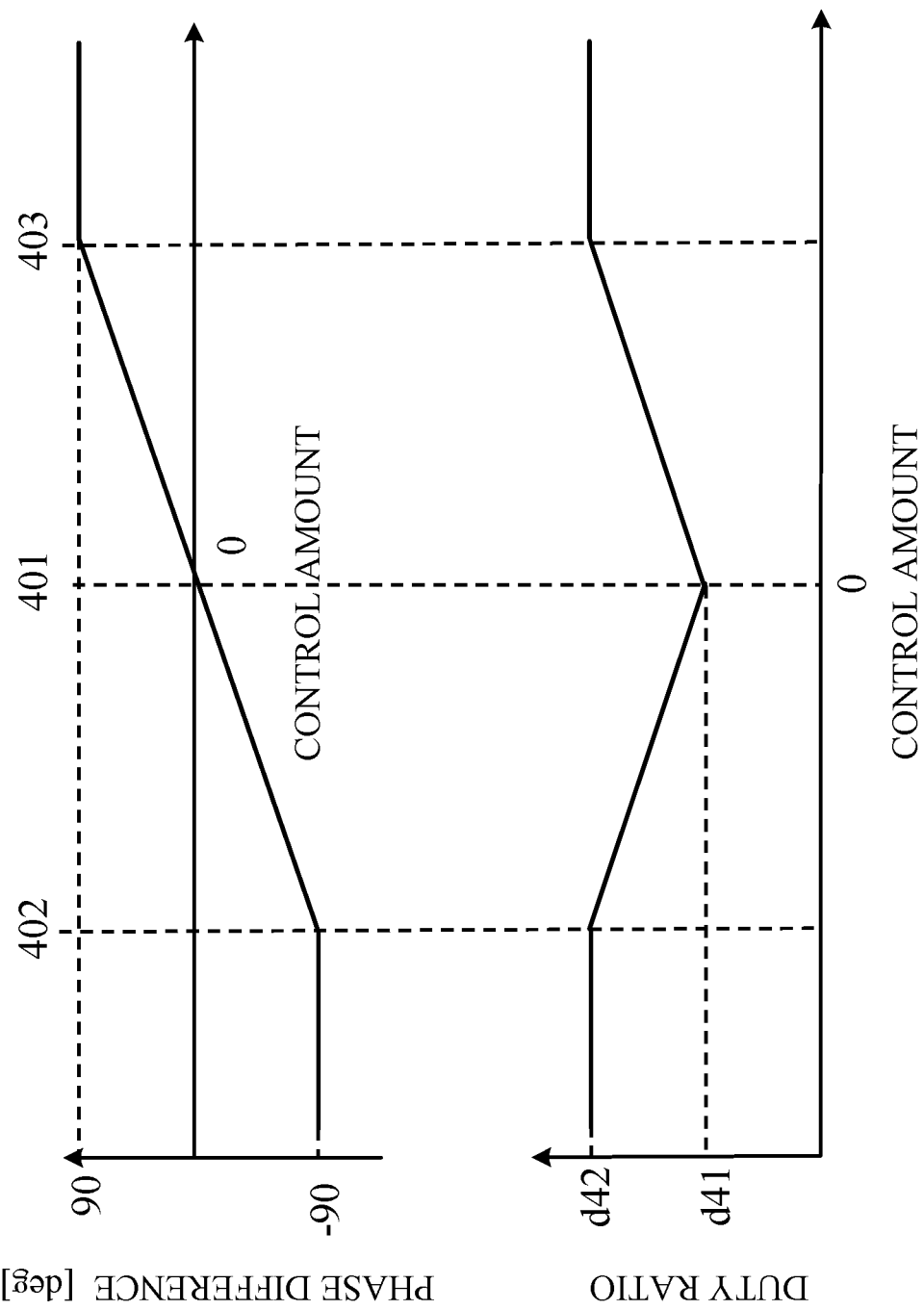
FIGS. 4A and 4B are diagrams illustrating an example of a relationship between a phase difference and a duty ratio according to the first embodiment.

Hereinafter, a method will be described of determining the duty ratio according to the phase difference with reference to FIGS. 4A and 4B. FIGS. 4A and 4B are diagrams illustrating an example of a relationship between the phase difference and the duty ratio. In FIG. 4A, a horizontal axis represents the control amount calculated by the control amount calculator 105, and a vertical axis represents the phase difference. In FIG. 4B, a horizontal axis represents the control amount calculated by the control amount calculator 105, and a vertical axis represents the duty ratio.

When the control amount is a value (=zero) indicated by a dotted line 401, the phase difference is zero. At this time, the duty ratio is d41. The phase difference increases as the control amount increases from zero. As the phase difference increases, the duty ratio increases in a linear relationship. The duty ratio is d42 when the control amount is a value indicated by a dotted line 403. When the control amount becomes larger than the value indicated by the dotted line 403, the driving control apparatus 102 shifts the driving control method of the vibration actuator 112 from the phase difference control to the frequency control. In the frequency control, the phase difference is constant at 90 degrees, and the duty ratio is also constant at d42.

As the control amount decreases from zero, the phase difference decreases and takes a negative value. The sign of the phase difference indicates the traveling direction, and a negative value of the phase difference indicates that the traveling direction is in an opposite direction. When the phase difference is negative, the duty ratio is determined according to the absolute value of the phase difference. That is, the duty ratio increases as the phase difference decreases. The duty ratio is d42 when the control amount takes a value indicated by a dotted line 402. When the control amount becomes smaller than the value indicated by the dotted line 402, the driving control apparatus 102 shifts the driving control method of the vibration actuator 112 from the phase difference control to the frequency control. In the frequency control, the phase difference is constant at −90 degrees, and the duty ratio is also constant at d42.

As described above, in this embodiment, the duty ratio decreases as the absolute value of the phase difference decreases. That is, the voltage amplitude of the power supplied to the vibration actuator 112 decreases as the absolute value of the phase difference decreases.

As the absolute value of the phase difference decreases, a vibration component increases of the elliptic motion in the direction (y direction in FIG. 2) vertical to the traveling direction (x direction in FIG. 2) of the vibration actuator 112. In this embodiment, as the absolute value of the phase difference decreases, the duty ratio decreases, that is, the voltage amplitude decreases, so that the vibration component of the elliptic motion can be suppressed in the direction vertical to the traveling direction. By suppressing the vibration component in the direction vertical to the traveling direction, noise and unnecessary vibration can be suppressed, and power consumption can be reduced.

Figure 5:
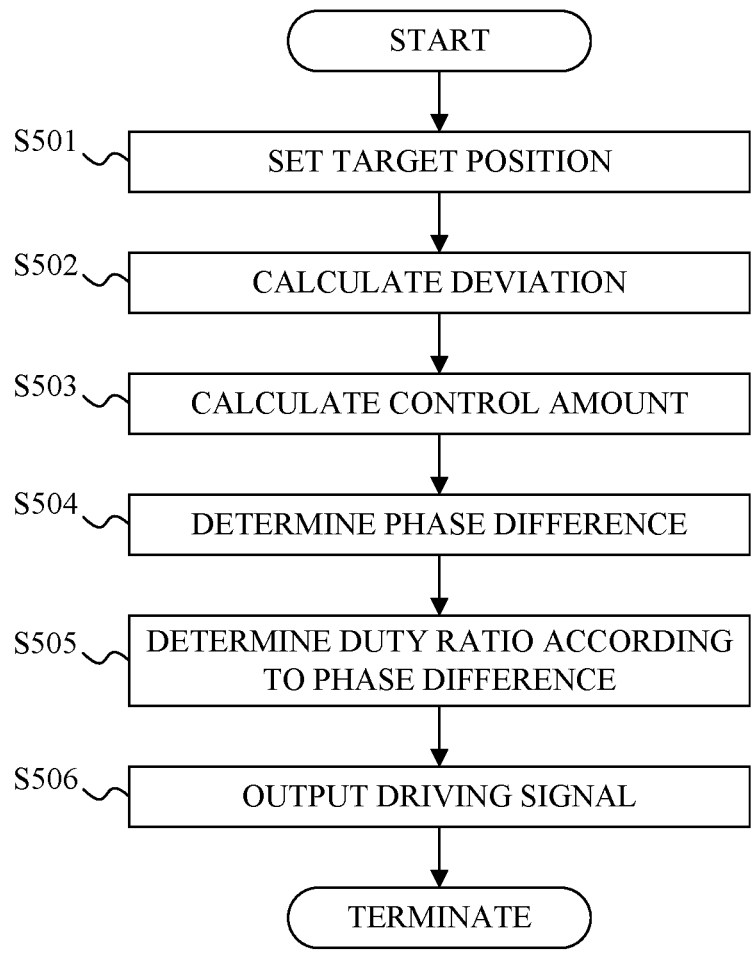
FIG. 5 is a flowchart illustrating a method for driving the vibration actuator by controlling the phase difference according to the first embodiment.

Hereinafter, a flow will be described of determining the phase difference and duty ratio and outputting the driving signal, when the vibration actuator 112 is moved to the final stop position, that is a final target position, by the phase difference control with reference to FIG. 5. FIG. 5 is a flowchart illustrating a method for driving the vibration actuator 112 by the phase difference control according to this embodiment. In the phase difference control, the frequency is fixed to the start frequency, as described above.

In step S501, the target value input unit 104 sets the target position to which the vibration actuator 112 moves.

In step S502, the controller 103 calculates a difference, that is a deviation, between the target position to which the vibration actuator 112 moves and the position of the vibration actuator 112 acquired from the position information detected by the detector 111.

In step S503, the control amount calculator 105 calculates the control amount using the PID control based on the difference calculated in step S502.

In step S504, the phase difference frequency determiner 106 determines the phase difference from the control amount calculated in step S503.

In step S505, the duty ratio determiner 107 determines the duty ratio according to the phase difference determined in step S504, by using the relationship illustrated in FIGS. 4A and 4B. In this embodiment, the relationship illustrated in FIGS. 4A and 4B is used, but a relationship may be used that is different from the relationship illustrated in FIGS. 4A and 4B.

In step S506, the signal generator 108 generates the two-phase driving signal having phase difference based on the phase difference, the frequency, and the duty ratio, and outputs the two-phase driving signal to the driving circuit 109. The controller 103 stores, as set values, the phase difference, the frequency, and the duty ratio.

As described above, when driving the vibration actuator 112 at low speed, this embodiment can suppress noise and unnecessary vibration while reducing the power consumption, by controlling the duty ratio according to the phase difference.

Second Embodiment

Figure 6:
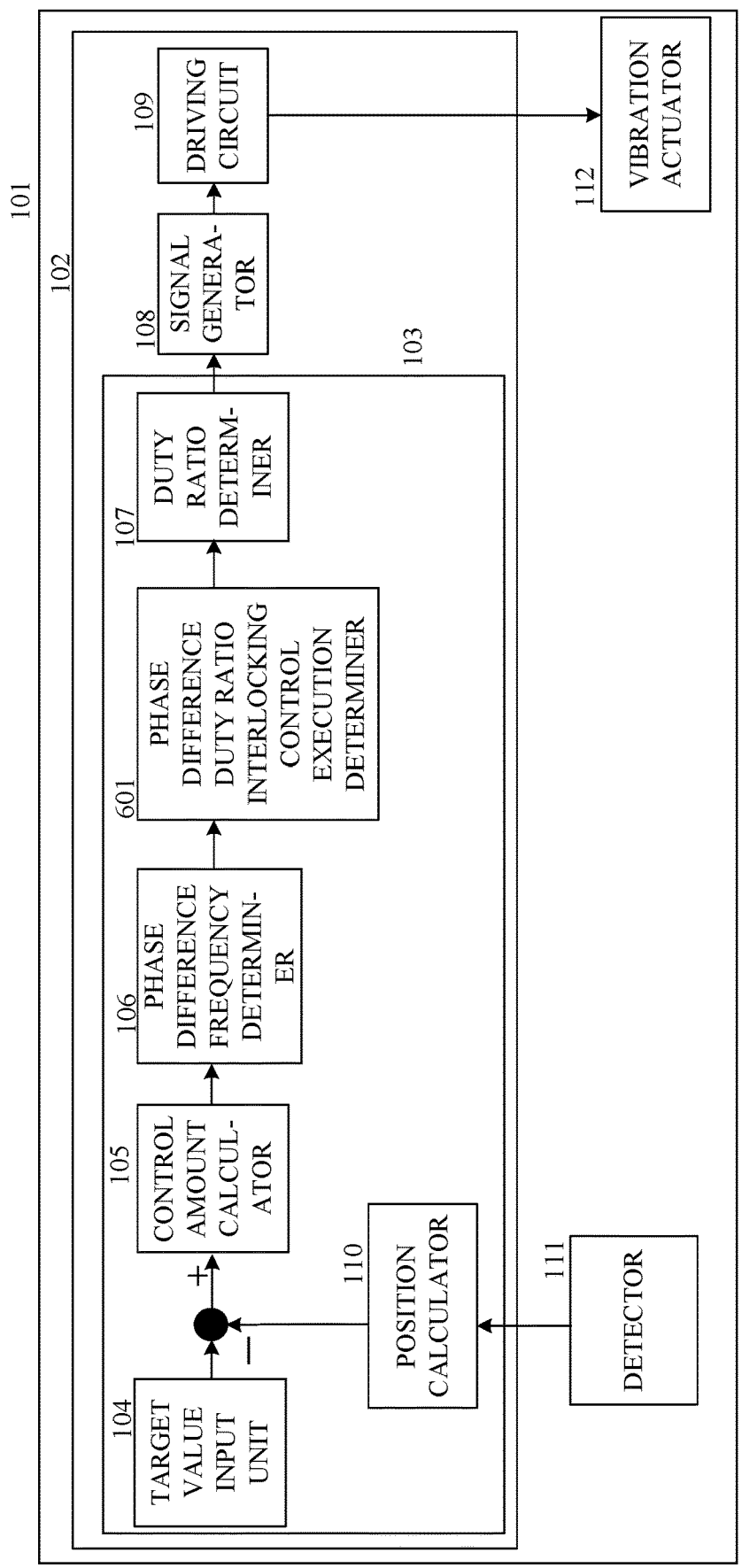
FIG. 6 is a block diagram illustrating a driving control system according to a second embodiment.

FIG. 6 is a block diagram illustrating a driving control system 101 according to this embodiment. A controller 103 of this embodiment includes a phase difference duty ratio interlocking control execution determiner 601. The phase difference duty ratio interlocking control execution determiner 601 is configured to determine whether or not to determine the duty ratio according to the phase difference, depending on a situation in which the vibration actuator 112 is operated, or depending on an operation mode in which the vibration actuator 112 is to be operated. Since the other configurations of the driving control system 101 of this embodiment are the same as the configurations of the driving control system 101 of the first embodiment, detailed description thereof will be omitted.

Figure 7:
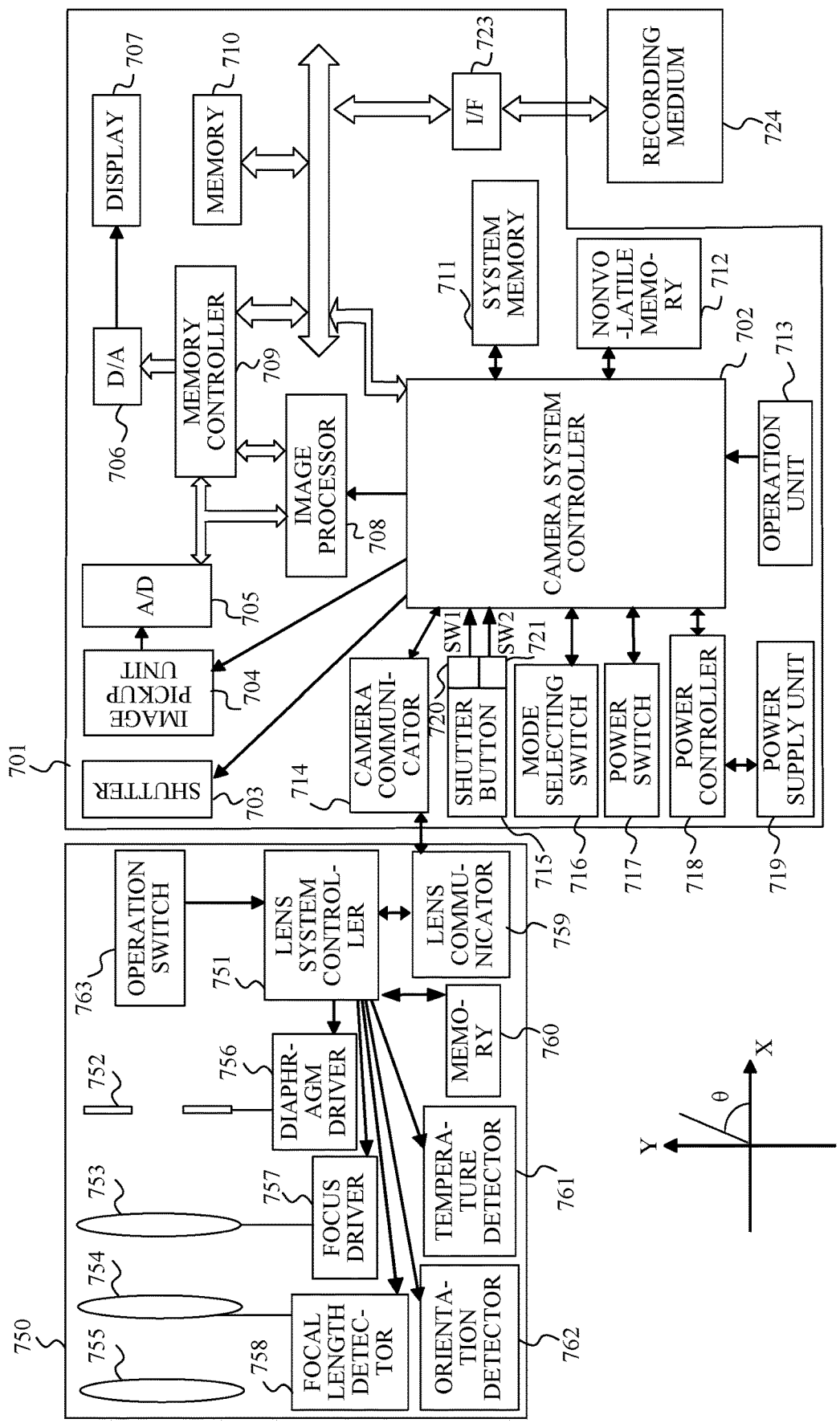
FIG. 7 is a block diagram illustrating a lens interchangeable digital single lens reflex camera as an example of an image pickup apparatus according to the second embodiment.

FIG. 7 is a block diagram illustrating a lens interchangeable digital single lens reflex camera, which is an example of an image pickup apparatus having a driving control system 101. In this embodiment, the driving control system 101 is used to drive a focus lens unit 753 as an optical unit described later. The digital single lens reflex camera includes a digital single lens reflex camera main body 701 and a lens apparatus 750. The digital single lens reflex camera main body 701 is mechanically and electrically connected to the lens apparatus 750, and supplies power to the lens apparatus 750 via a power supply terminal.

First, the configuration will be described of the digital single lens reflex camera main body 701.

An image pickup unit 704 is an image sensor including a CCD, CMOS, or the like, and is configured to convert, into an electric signal, an optical image in which a light amount is adjusted by a shutter 703. An A/D converter 705 is configured to convert an analog signal output from the image pickup unit 704 into a digital signal. An image processor 708 is configured to perform pixel interpolation, resizing processing, or color conversion processing on the data from the A/D converter 705 or the data from a memory controller 709. The image processor 708 is configured to perform predetermined calculation processing using captured still image data. A camera system controller 702 is configured to perform an exposure control and a focus detection control using a calculation result acquired from the image processor 708. AF (autofocus) processing, AE (auto-exposure) processing, and EF (pre-flash) processing are performed of a TTL (through-the-lens) method. The image processor 708 performs the predetermined calculation processing using the captured still image data, and to perform AWB (auto white balance) processing of the TTL method based on an acquired calculation result.

The output data from the A/D converter 705 is written on a memory 710 via the image processor 708 and the memory controller 709, or the memory controller 709. The memory 710 is configured to store the still image data from the A/D converter 705 and still image data for display that is to be displayed on a display 707. The memory 710 also serves as a memory (video memory) for displaying a still image. A D/A converter 706 is configured to convert the still image data for display stored on the memory 710 into an analog signal and to supply it to the display 707. The still image data for display stored on the memory 710 is displayed on the display 707 via the D/A converter 706.

The display 707 is a display such as an LCD, and is configured to perform display according to the analog signal from the D/A converter 706. The A/D converter 705 performs an A/D conversion on a digital signal. The memory 710 accumulates the digital signal. Thereafter, the digital signal is analog-converted by the D/A converter 706, is sequentially transmitted to the display 707, and is displayed, so that a through still image can be displayed, that is, live view display can be performed.

A nonvolatile memory 712 is a memory as a recording medium that is capable of electric erasing and recording, and is, for example, an EEPROM or the like. The nonvolatile memory 712 stores a constant, program, and the like for operation of the camera system controller 702.

The camera system controller 702 includes at least one CPU or circuit and is configured to control the entire digital single lens reflex camera. The camera system controller 702 is configured to execute a program recorded on the nonvolatile memory 712. A system memory 711 is, for example, a RAM. In the system memory 711, a constant, a variable, a program read from the nonvolatile memory 712, and the like are expanded for operation of the camera system controller 702. The camera system controller 702 is configured to control display by controlling the image processor 708, the memory controller 709, and the memory 710.

An operation unit 713, a shutter button 715, and a mode selecting switch 716 are operation units for inputting various operation instructions to the camera system controller 702. By operating the mode selecting switch 716, the operation mode of the camera system controller 702 can be switched to any one of a still image pickup mode, a motion image pickup mode, a playback mode, and the like. The modes included in the still image recording mode are, for example, an auto image pickup mode, an auto scene discrimination mode, a manual mode, various scene modes of image pickup settings for various image pickup scenes, a program AE mode, and a custom mode.

A first shutter switch 720 is turned on by a so-called half-depression as an image pickup preparation instruction in the middle of the operation of the shutter button 715, and a first shutter switch signal SW1 is generated. When the first shutter switch signal SW1 is generated, operations start such as AF processing, AE processing, AWB processing, and EF processing.

A second shutter switch 721 is turned by a so-called full-depression as an image pickup instruction when operation on the shutter button 715 is completed, and a second shutter switch signal SW2 is generated. When the second shutter switch signal SW2 is generated, the camera system controller 702 starts a series of operations on image pickup processing from reading the signal from the image pickup unit 704 to writing the still image data on the recording medium 724.

When various function icons displayed on the display 707 are selected and operated, each operation member of the operation unit 713 is assigned to a function properly for each scene, and acts as various function buttons.

A power switch 717 is an operating unit configured to switch power ON/OFF of the digital single lens reflex camera main body 701. A power controller 718 includes a battery detection circuit, a DC-DC converter, a switch circuit for switching a block to be energized, and the like, and to detect whether or not a battery is installed, a type of battery, and a remaining battery level. The power controller 718 is configured to control a DC-DC converter based on a detection result, and an instruction from the camera system controller 702, and to supply required voltage to each unit including the recording medium 724 for a required period. The power supply unit 719 includes a primary battery such as an alkaline battery and a lithium battery, a secondary battery such as an NiCd battery, an NiMH battery, and a Li battery, an AC adapter, and the like.

A recording medium I/F 723 is an interface with a recording medium 724 such as a memory card or a hard disk. The recording medium 724 is a recording medium such as a memory card for recording a captured still image, and includes a semiconductor memory, an optical disk, a magnetic disk, or the like.

A camera communicator 714 is configured to give a desired operation instruction such as an instruction for driving a focus lens and a diaphragm to the lens apparatus 750 via a lens communicator 759, and is configured to transmit/receive necessary information.

Next, a configuration of the lens apparatus 750 will be described.

The lens apparatus 750 includes an image pickup optical system having a diaphragm 752, a focus lens unit 753, a zoom lens unit 754, and a front lens unit 755.

A lens system controller 751 is a computer including a CPU or the like, and is configured to control the entire lens apparatus 750 including a diaphragm driver 756, a focus driver 757, a focal length detector 758, the lens communicator 759, and a memory 760. The lens system controller 751 is configured to transmit/receive information to/from the digital single lens reflex camera main body 701 via the lens communicator 759.

The diaphragm driver 756 is configured to control an aperture diameter of the diaphragm 752 according to an instruction from the lens system controller 751 and to perform a light amount adjustment operation.

The focus driver 757 includes the driving control system 101, and is configured to drive the focus lens unit 753 in an optical axis direction, as an x direction, according to an instruction from the lens system controller 751 so as to adjust the focus.

An operation switch 763 includes a manual operation switch for zooming, focusing, and a diaphragm, and a setting switch for switching automatic/manual.

A focal length detector 758 is configured to detect a focal length of the image pickup optical system by detecting a position of the zoom lens unit 754 using a zoom position sensor such as a variable resistor.

A memory 760 includes a ROM, RAM, or the like, and is configured to store a product model number, a serial number, focal length information, focus sensitivity information, and the like of the lens apparatus 750.

A temperature detector 761 can detect an environment in which the lens apparatus 750 is used.

An orientation detector 762 is configured to detect an orientation, that is, a position, of the lens apparatus 750 relative to a gravity direction as a y direction. An acceleration sensor or the like can be used as the orientation detector 762. Based on the orientation detected by the orientation detector 762, it is possible to determine whether the lens apparatus 750 is in a horizontal state or in a vertical state.

For example, when the shutter button 715 is half-depressed and operation is performed for detecting focus, the camera system controller 702 transmits a driving instruction for the focus lens unit 753 to the lens system controller 751 via the camera communicator 714 and via the lens communicator 759. The driving instruction for the focus lens unit 753 is a moving amount of the focus lens unit 753 to an in-focus position and a velocity of the focus lens unit 753 when the focus lens unit 753 moves, each of which is calculated from a defocus amount corresponding to a phase difference of a signal of an object image. When the lens system controller 751 receives the driving instruction for the focus lens unit 753, the lens system controller 751 moves the focus lens unit 753 to the in-focus position via the focus driver 757. The lens system controller 751 transmits information on the image pickup mode to the focus driver 757.

In the following description, a driving control for the focus lens unit 753 will be described in a case where the still image pickup mode or the motion image pickup mode is selected by using the mode selecting switch 716. The image pickup mode selected by the mode selecting switch 716 is transmitted to the lens apparatus 750 via the camera communicator 714 and the lens communicator 759. The still image pickup mode requires a wide velocity area from a low velocity to a high velocity. In the motion image pickup mode, the velocity may be relatively low, but quietness is required.

The control will be described of the duty ratio relative to the phase difference according to the image pickup mode. FIG. 8 is a diagram illustrating an example of a relationship between the phase difference and the duty ratio of this embodiment. Since the relationship between the phase difference and the duty ratio in the still image pickup mode is the same as the relationship illustrated in FIGS. 4A and 4B described in the first embodiment, detailed description thereof will be omitted. In the motion image pickup mode, the duty ratio is not controlled according to the phase difference, and thus the duty ratio is constant at d81 regardless of the phase difference.

Figure 9:
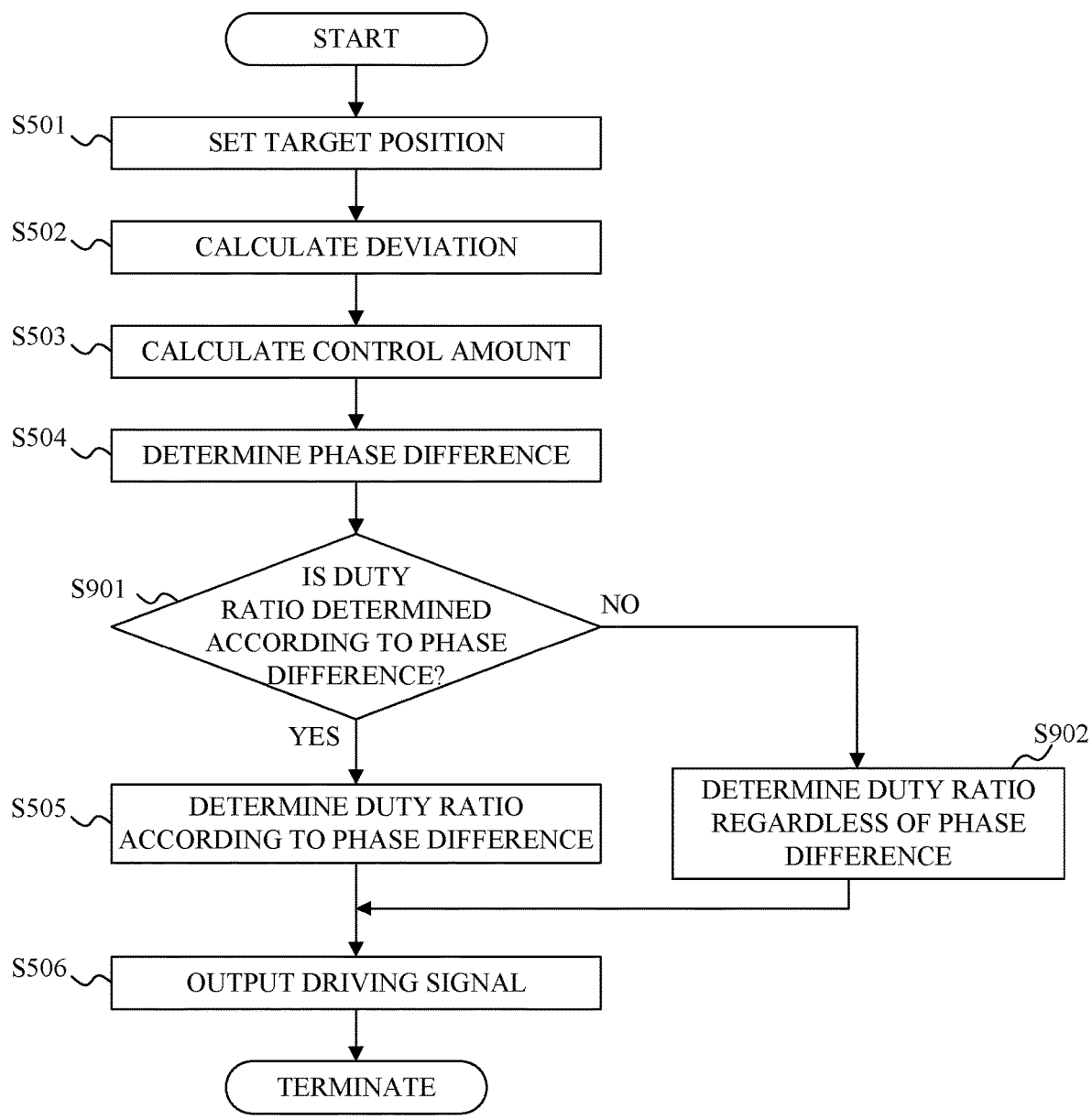
FIG. 9 is a flowchart illustrating a method for driving a vibration actuator by a phase difference control according to the second embodiment.

FIG. 9 is a flowchart illustrating a method of driving the vibration actuator 112 by a phase difference control of this embodiment. In this embodiment, a part different from the sequence of FIG. 5 will be described.

The lens system controller 751 moves the focus lens unit 753 to the in-focus position via the focus driver 757, and transmits information on the image pickup mode to the focus driver 757.

In step S901, the phase difference duty ratio interlocking control execution determiner 601 determines whether or not to determine the duty ratio according to the phase difference, according to the image pickup mode. When the still image pickup mode is set, it is determined that the duty ratio is determined according to the phase difference, and the process proceeds to step S505. When the motion image pickup mode is set, it is determined that the duty ratio is not determined according to the phase difference, and the process proceeds to step S902.

In step S902, the duty ratio determiner 107 determines the duty ratio regardless of the phase difference.

As described above, according to the configuration of this embodiment, in addition to the effect of the first embodiment, the vibration actuator 112 can be properly driven by selecting the relationship between the phase difference and the duty ratio according to the operation mode.

When the motion image pickup mode is set, this embodiment determines the duty ratio regardless of the phase difference, but the duty ratio may be determined according to the phase difference. In this case, a minimum value of the duty ratio is set to be smaller than a minimum value of the duty ratio in the image pickup mode.

This embodiment determines whether or not the duty ratio is determined according to the phase difference, according to the image pickup mode. However, the present invention is not limited to this. An operation instruction for the vibration actuator 112 may be used for the determination. For example, an instruction value may be used for the determination, the instruction value relating to the moving amount to the final target position given to the vibration actuator 112. Specifically, when the instruction value for the moving amount is smaller than a predetermined value, the duty ratio may be not determined according to the phase difference. When the instruction value for the moving amount is larger than the predetermined value, the duty ratio may be determined according to the phase difference. The determination may be performed by using an instruction value relating to a velocity of the vibration actuator 112. When the instruction value relating to the velocity of the vibration actuator 112 is larger than a predetermined value, the duty ratio may not be determined according to the phase difference. When the instruction value relating to the velocity of the vibration actuator 112 is smaller than the predetermined value, the duty ratio may be determined according to the phase difference.

Third Embodiment

Figure 10:
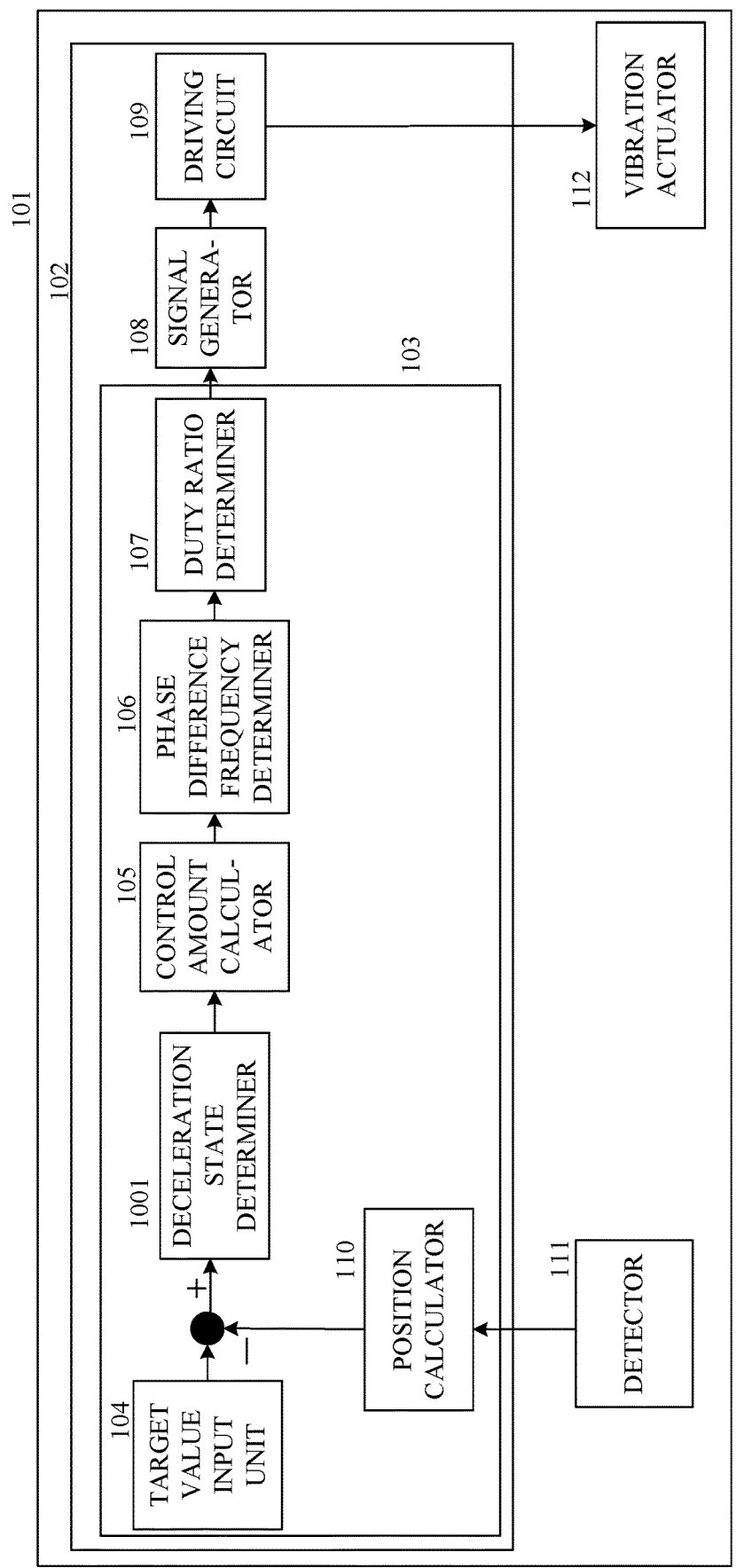
FIG. 10 is a block diagram illustrating a driving control system according to a third embodiment.

FIG. 10 is a block diagram of a driving control system 101 of this embodiment. Stopping accuracy is required while unnecessary vibration is suppressed, when the focus lens unit 753 is driven at low velocity. However, the stopping accuracy may deteriorate due to frictional force or the like. In this embodiment, the controller 103 includes a deceleration state determiner 1001 configured to determine an operation state of the vibration actuator 112, so that the vibration actuator 112 stops at a stop position with high accuracy. The controller 103 is configured to use a determination result of the deceleration state determiner 1001 to determine whether or not it is necessary to make the vibration actuator 112 decelerate from a current velocity. Since the other configurations of the driving control system 101 of this embodiment are the same as the configurations of the driving control system 101 of the first embodiment, detailed description thereof will be omitted. Since the configuration of the digital single lens reflex camera having the driving control system 101 of this embodiment is the same as the configuration of the digital single lens reflex camera of the second embodiment, detailed description thereof will be omitted.

Figure 11:
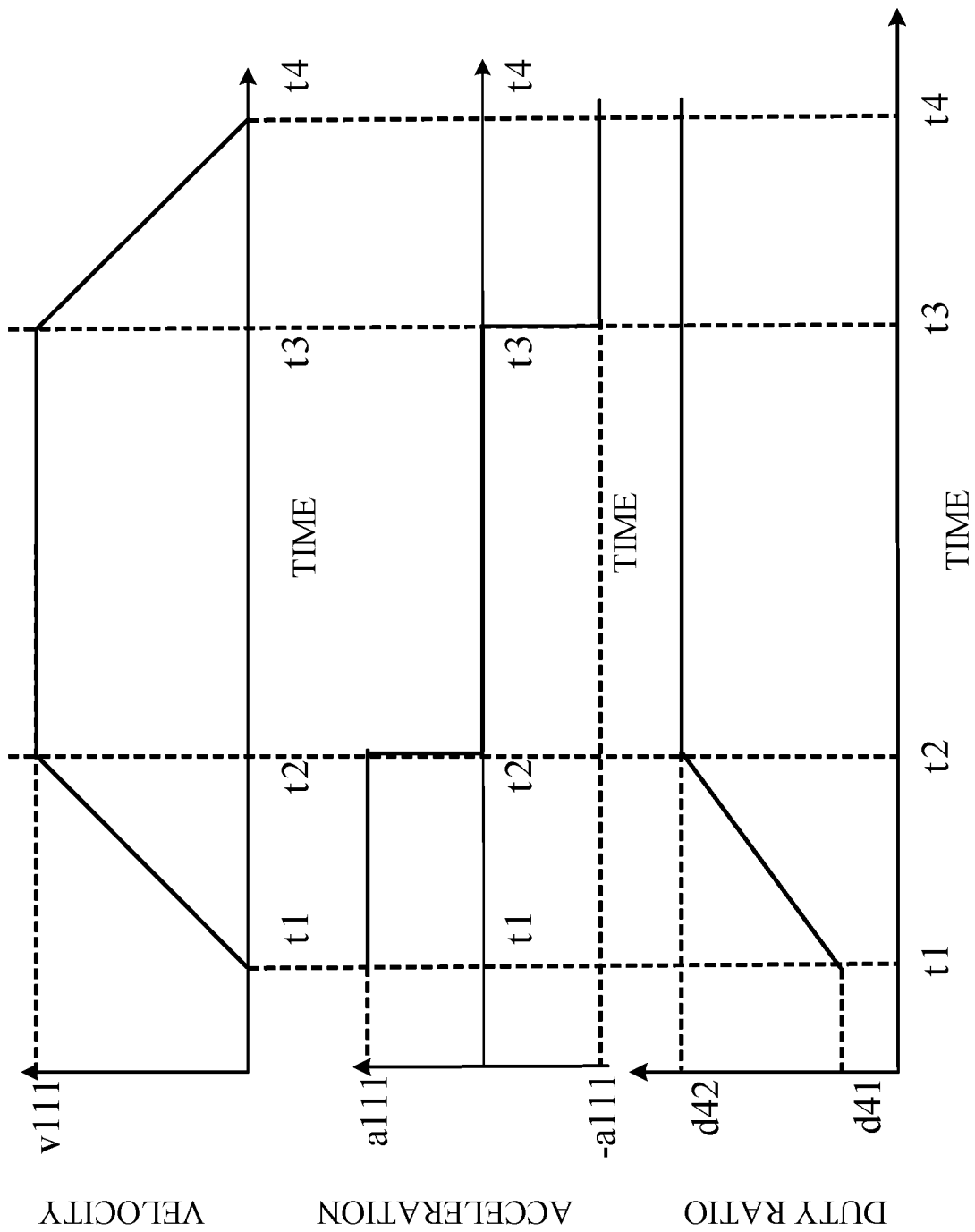
FIGS. 11A to 11C are diagrams illustrating an example of a relationship between a velocity, an acceleration, and a duty ratio according to the third embodiment.

FIGS. 11A to 11C are diagrams illustrating an example of a relationship between a velocity, acceleration, and duty ratio of this embodiment. In each of FIGS. 11A to 11C, a horizontal axis represents time. The vibration actuator 112 starts driving at time t1, reaches velocity v111 at time t2, starts deceleration at time t3, and stops at a final target position at time t4. From the time t1 to t2, acceleration of the vibration actuator 112 is set to a111 so that the velocity increases to velocity v111. From the time t1 to t2, the duty ratio is increased from d41 to d42. From the time t2 to t3, the acceleration of the vibration actuator 112 is set to zero. Thereby, the vibration actuator 112 is driven at a constant velocity, and the phase difference also takes a constant value. From time t3 to t4, the acceleration of the vibration actuator 112 is set to −a111 so that the vibration actuator decelerates. From the time t3 to t4, the duty ratio is maintained at d42 without being updated.

Figure 12:
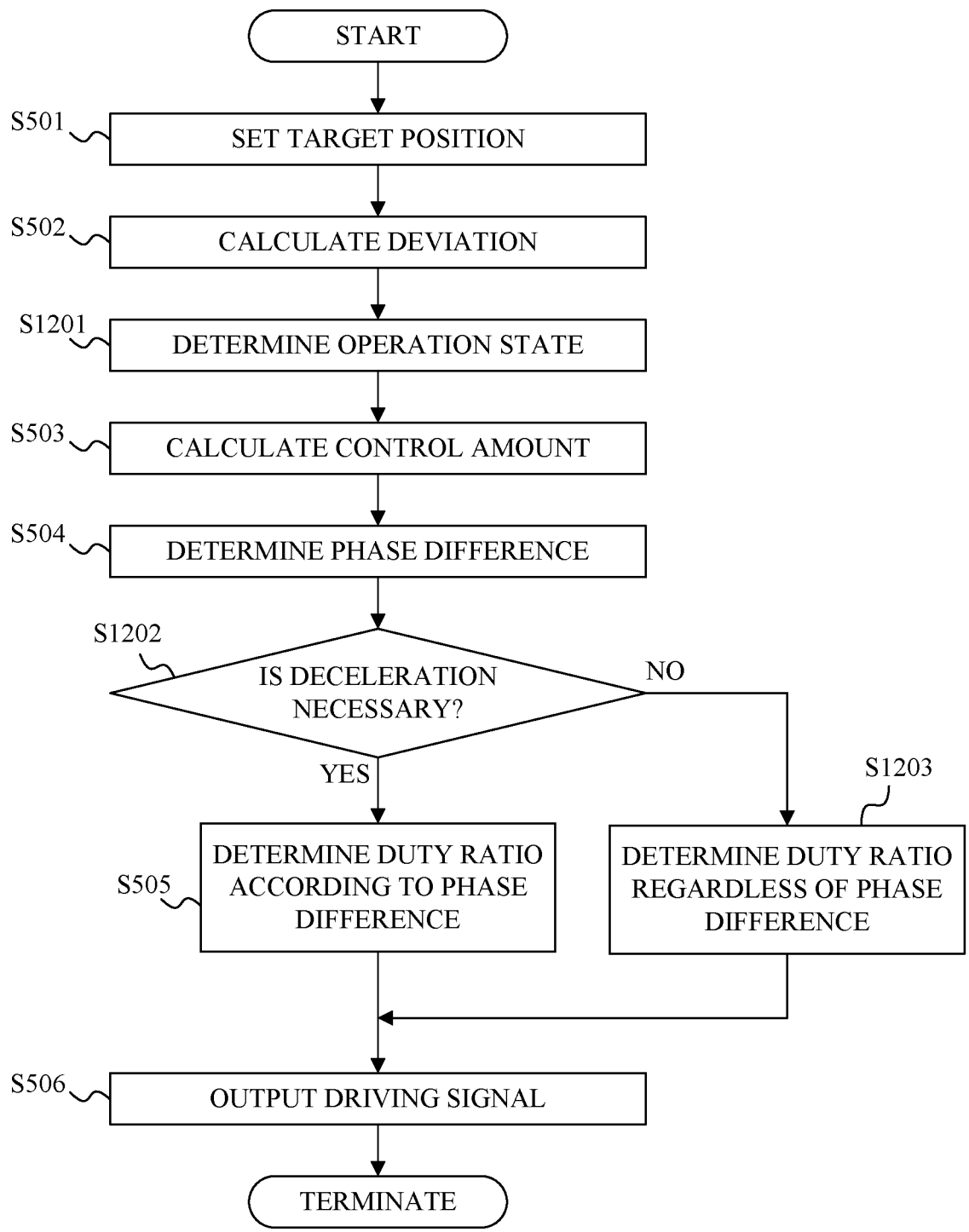
FIG. 12 is a flowchart illustrating a method for driving a vibration actuator by a phase difference control according to the third embodiment.

FIG. 12 is a flowchart illustrating a method of driving the vibration actuator 112 by a phase difference control of this embodiment. In this embodiment, part different from the sequence of FIG. 5 will be described.

In step S1201, the deceleration state determiner 1001 determines the operation state of the vibration actuator 112. In this embodiment, when the acceleration of the vibration actuator 112 is negative, it is determined that the operation state of the vibration actuator 112 is in a deceleration state.

When the acceleration of the vibration actuator 112 is not negative, it is determined that the operation state of the vibration actuator 112 is not in the deceleration state.

In step S1202, the controller 103 determines whether or not it is necessary to make the vibration actuator 112 decelerate, based on the operation state of the vibration actuator 112 determined in step S1201. When the vibration actuator 112 is in the deceleration state and it is necessary to make the vibration actuator 112 decelerate, the process proceeds to step S505. When the vibration actuator 112 is not in the deceleration state and it is not necessary to make the vibration actuator 112 decelerate, the process proceeds to step S1203.

In step 1203, the duty ratio determiner 107 determines the value currently held as the duty ratio regardless of the phase difference, that is, the value of the duty ratio is maintained.

As described above, the configuration of this embodiment can stop the vibration actuator 112 with high accuracy in addition to the effect of the first embodiment.

Fourth Embodiment

Figure 13:
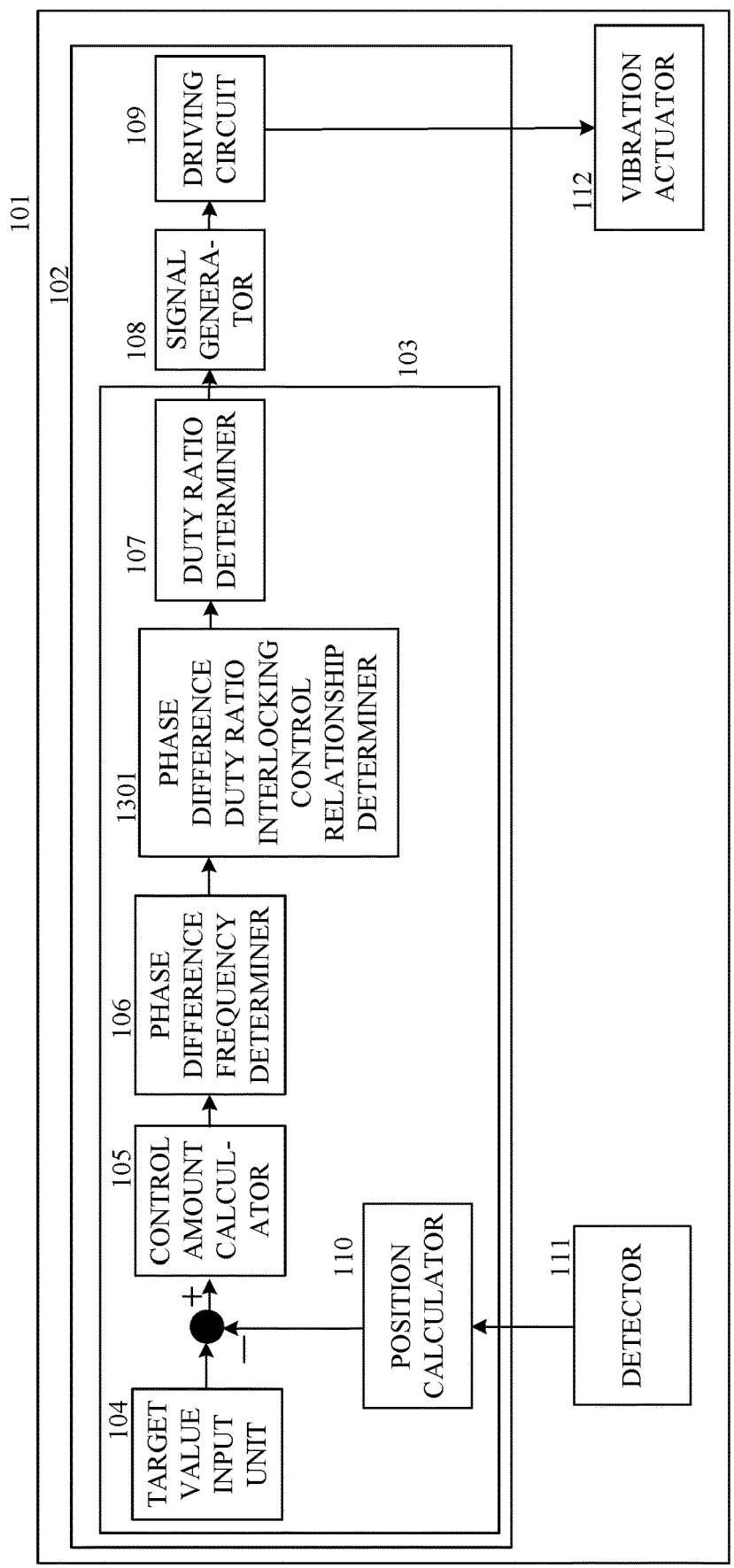
FIG. 13 is a block diagram illustrating a driving control system according to a fourth embodiment.

FIG. 13 is a block diagram illustrating a driving control system 101 of this embodiment. The controller 103 of this embodiment includes a phase difference duty ratio interlocking control relationship determiner 1301. The phase difference duty ratio interlocking control relationship determiner 1301 is configured to select a proper relationship from a plurality of relationships between the phase difference and the duty ratio according to a state in which the digital single lens reflex camera is used. In this embodiment, the phase difference duty ratio interlocking control relationship determiner 1301 selects a relationship between the phase difference and the duty ratio by using information from the orientation detector 762 of the lens apparatus 750. Since the other configurations of the driving control system 101 of this embodiment are the same as the configurations of the driving control system 101 of the first embodiment, detailed description thereof will be omitted. Since the configuration of the digital single lens reflex camera including the driving control system 101 of this embodiment is the same as the configuration of the digital single lens reflex camera of the second embodiment, detailed description thereof will be omitted.

A driving direction (x direction in FIG. 2) of the vibration actuator 112 is parallel to an optical axis direction (x direction in FIG. 7), the optical axis direction being a driving direction of the focus lens unit 753. The driving direction of the vibration actuator 112 is vertical to the gravity direction, that is the y direction in FIG. 7. When the driving direction of the vibration actuator 112 is vertical to the gravity direction, the vibration actuator 112 is easily affected by gravity, and it may be difficult to stop the driving of the focus lens unit 753. Thus, in this embodiment, a relationship between the phase difference and the duty ratio is changed according to the orientation of the lens apparatus 750 at a time of use, specifically, by comparing an angle θ for the x direction in FIG. 7 and a threshold value θt.

Figures 14A, 14B:
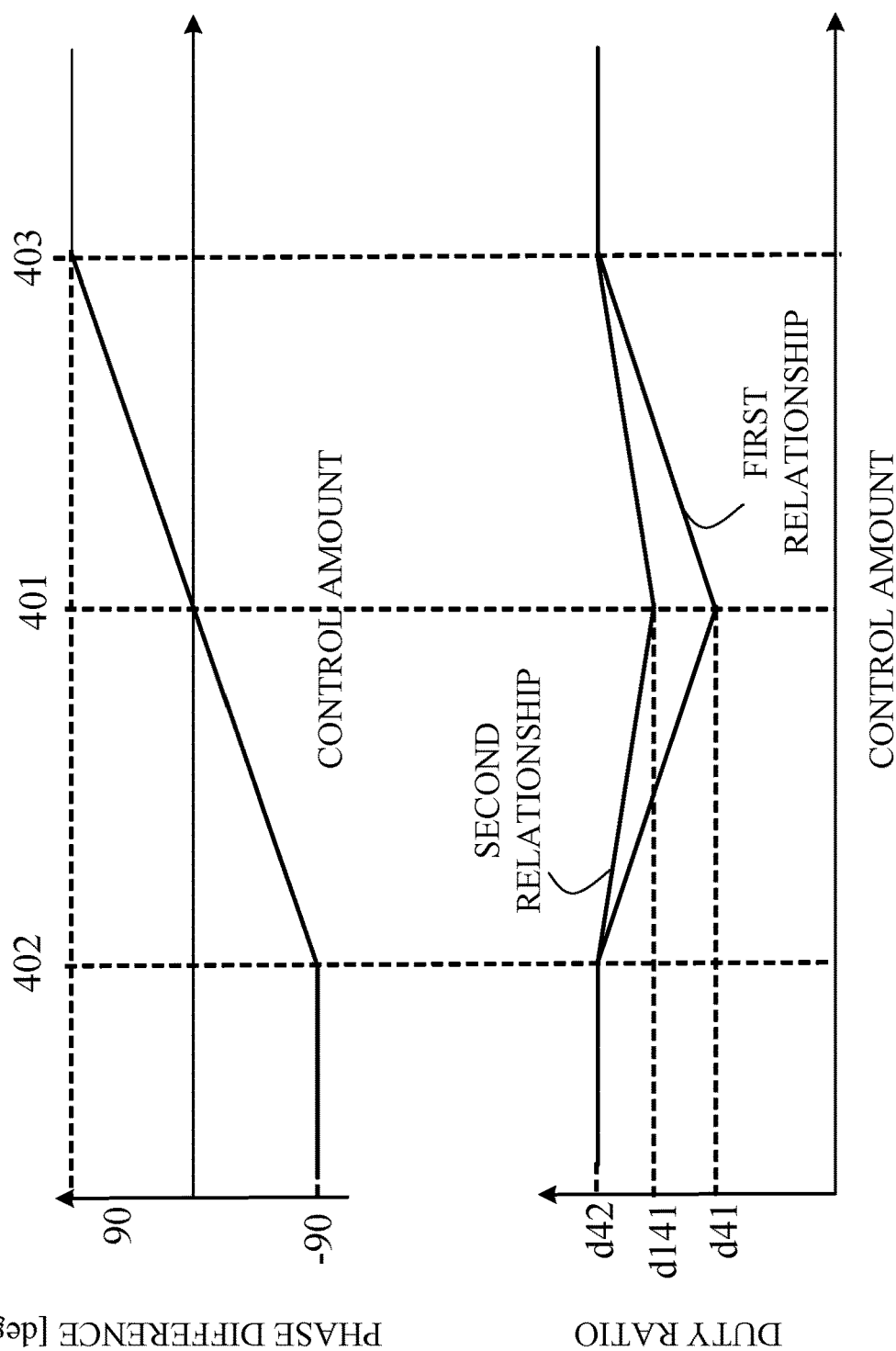
FIGS. 14A and 14B are diagrams illustrating an example of a relationship between a phase difference and a duty ratio according to the fourth embodiment.

FIGS. 14A and 14B are diagrams each illustrating an example of a relationship between the phase difference and the duty ratio of this embodiment. When the angle θ is smaller than the threshold value θt, the duty ratio changes based on a first relationship. Since the first relationship is the same as the relationship illustrated in FIGS. 4A and 4B described in the first embodiment, detailed description thereof will be omitted. When the angle θ is larger than the threshold value θt, the duty ratio changes based on a second relationship. In the second relationship, when a control amount is at a value (=zero) indicated by a dotted line 401, the duty ratio is d141 larger than d41 which is a minimum value of the duty ratio in the first relationship. As the control amount increases from zero, the duty ratio increases in a linear relationship. The duty ratio is d42 when the control amount is a value indicated by the dotted line 403. When the control amount becomes larger than the value indicated by the dotted line 403, the driving control apparatus 102 shifts a driving control method of the vibration actuator 112 from the phase difference control to the frequency control. In the frequency control, the phase difference is constant at 90 degrees, and the duty ratio is also constant at d42. As the control amount decreases from zero, the phase difference decreases and becomes a negative value. A sign of the phase difference indicates the traveling direction, and a negative value of the phase difference indicates that the traveling direction is in an opposite direction. When the phase difference is negative, the duty ratio is determined according to the absolute value of the phase difference. That is, the duty ratio increases as the phase difference decreases. The duty ratio is d42 when the control amount is a value indicated by a dotted line 402. When the control amount becomes smaller than the value indicated by the dotted line 402, the driving control apparatus 102 shifts the driving control method of the vibration actuator 112 from the phase difference control to the frequency control. In the frequency control, the phase difference is constant at −90 degrees, and the duty ratio is also constant at d42.

Figure 15:
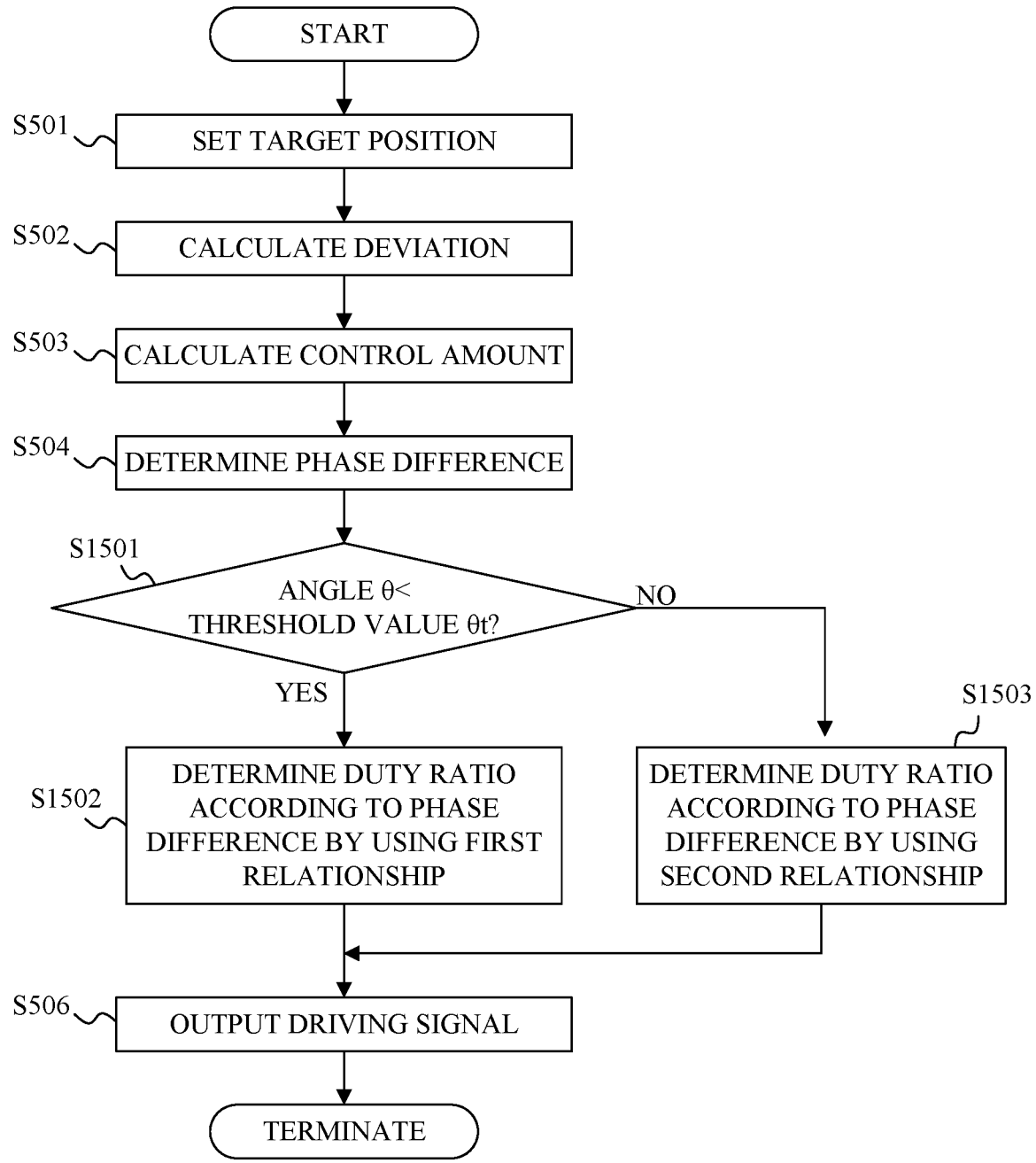
FIG. 15 is a flowchart illustrating a method for driving a vibration actuator by a phase difference control according to the fourth embodiment.

FIG. 15 is a flowchart illustrating a method of driving the vibration actuator 112 by a phase difference control of this embodiment. In this embodiment, part different from the sequence of FIG. 5 will be described.

The lens system controller 751 moves the focus lens unit 753 to the in-focus position via the focus driver 757, and transmits orientation information (angle θ) of the lens apparatus 750 to the focus driver 757.

In step S1501, the phase difference duty ratio interlocking control relationship determiner 1301 determines whether or not to control the duty ratio according to the phase difference, by using the orientation information (angle θ) of the lens apparatus 750 acquired from the lens system controller 751. When the angle θ is smaller than the threshold value θt, the process proceeds to step S1502. When the angle θ is larger than the threshold value θt, the process proceeds to step S1503. It is possible to arbitrarily set which step to proceed when the angle θ is equal to the threshold value θt.

In step S1502, the duty ratio determiner 107 determines the duty ratio according to the phase difference determined in step S504 by using the first relationship illustrated in FIGS. 14A and 14B.

In step S1503, the duty ratio determiner 107 determines the duty ratio according to the phase difference determined in step S504 using the second relationship illustrated in FIGS. 14A and 14B.

As described above, according to the configuration of this embodiment, it is possible to stop the vibration actuator 112 with high accuracy in addition to the effect of the first embodiment.

In this embodiment, the duty ratio is controlled according to the phase difference even when the orientation information (angle θ) is larger than the threshold value θt, but the duty ratio may not be controlled, that is, the duty ratio may be determined regardless of the phase difference.

In this embodiment, the phase difference duty ratio interlocking control relationship determiner 1301 selects the relationship between the phase difference and the duty ratio according to the orientation of the lens apparatus 750 as the state in which the digital single lens reflex camera is used. However, the present invention is not limited to this. For example, in a low temperature environment, when grease or the like is used to a driven member, a load acting on the vibration actuator 112 may change due to a change in viscosity. The relationship between the phase difference and the duty ratio may be selected according to a temperature environment in which the digital single lens reflex camera is used. In this case, the relationship between the phase difference and the duty ratio may be selected using information from the temperature detector 761. That is, when a value indicating the temperature environment from the temperature detector 761 is larger than a predetermined value, the first relationship may be used, and when the value indicating the temperature environment from the temperature detector 761 is smaller than the predetermined value, the second relation may be used.

In addition to the temperature, humidity may be used to determine the relationship between the phase difference and the duty ratio. For example, in a high humidity environment, friction may change and the stopping accuracy may deteriorate. When a value indicating the humidity environment from a humidity detector (not illustrated) is smaller than a predetermined value, the first relationship may be used. When the value indicating the humidity environment from the humidity detector is larger than the predetermined value, the second relation may be used.

The above embodiments can provide a driving control apparatus, a driving control system, a lens apparatus, a driving control method, and a memory medium each of which can suppress noise and unnecessary vibration and can reduce power consumption, when the vibration actuator is driven at low velocity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-224307, filed on Dec. 12, 2019 which is hereby incorporated by reference herein in its entirety.

What is claimed is:

1. A driving control apparatus which controls an actuator that relatively moves a vibrator and a contact body contacting the vibrator, the vibrator being made to generate vibration by applying a first signal and a second signal having a phase difference, the driving control apparatus comprising:
   at least one processor or circuit configured to execute a plurality of tasks including:
   a first determining task configured to determine the phase difference; and
   a second determining task configured to determine a voltage amplitude of power supplied to the actuator so that the voltage amplitude decreases as an absolute value of the phase difference decreases.

2. The driving control apparatus according to claim 1, wherein the second determining task determines the voltage amplitude by using one relationship selected from a plurality of relationships between the phase difference and the voltage amplitude.

3. The driving control apparatus according to claim 1, wherein the second determining task determines the voltage amplitude according to an image pickup mode of an image pickup apparatus.

4. The driving control apparatus according to claim 3, wherein when the image pickup mode is a still image pickup mode, the second determining task determines the voltage amplitude so that the voltage amplitude decreases as the absolute value of the phase difference decreases, and
wherein when the image pickup mode is a motion image pickup mode, the second determining task determines the voltage amplitude so that the voltage amplitude decreases as the absolute value of the phase difference decreases and that a minimum value of the voltage amplitude is smaller than a minimum value of the voltage amplitude in the still image pickup mode.

5. The driving control apparatus according to claim 3, wherein when the image pickup mode is a still image pickup mode, the second determining task determines the voltage amplitude so that the voltage amplitude decreases as the absolute value of the phase difference decreases, and
wherein when the image pickup mode is a motion image pickup mode, the second determining task determines the voltage amplitude regardless of the phase difference.

6. The driving control apparatus according to claim 1, wherein the second determining task determines the voltage amplitude according to an operation instruction for the actuator.

7. The driving control apparatus according to claim 6, wherein when an instruction value relating to a moving amount of the actuator is larger than a predetermined value, the second determining task determines the voltage amplitude so that the voltage amplitude decreases as the absolute value of the phase difference decreases, and
wherein when the instruction value is smaller than the predetermined value, the second determining task determines the voltage amplitude regardless of the phase difference.

8. The driving control apparatus according to claim 6, wherein when an instruction value relating to a velocity of the actuator is smaller than a predetermined value, the second determining task determines the voltage amplitude so that the voltage amplitude decreases as the absolute value of the phase difference decreases, and
wherein when the instruction value is larger than the predetermined value, the second determining task determines the voltage amplitude regardless of the phase difference.

9. The driving control apparatus according to claim 6, wherein when an instruction value relating to an acceleration of the actuator is larger than a predetermined value, the second determining task determines the voltage amplitude so that the voltage amplitude decreases as the absolute value of the phase difference decreases, and
wherein when the instruction value is smaller than the predetermined value, the second determining task determines the voltage amplitude regardless of the phase difference.

10. The driving control apparatus according to claim 1, wherein the second determining task determines the voltage amplitude according to an orientation of an apparatus having the actuator.

11. The driving control apparatus according to claim 10, wherein when a value indicating the orientation is smaller than a predetermined value, the second determining task determines the voltage amplitude so that the voltage amplitude decreases as the absolute value of the phase difference decreases, and wherein when the value indicating the orientation is larger than the predetermined value, the second determining task determines the voltage amplitude so that the voltage amplitude decreases as the absolute value of the phase difference decreases, and that a minimum value of the voltage amplitude is larger than a minimum value of the voltage amplitude in a case the value indicating the orientation is smaller than the predetermined value.

12. The driving control apparatus according to claim 1, wherein the second determining task determines the voltage amplitude according to a temperature environment.

13. The driving control apparatus according to claim 12, wherein when a value indicating the temperature environment is larger than a predetermined value, the second determining task determines the voltage amplitude so that the voltage amplitude decreases as the absolute value of the phase difference decreases, and wherein when the value indicating the temperature environment is smaller than the predetermined value, the second determining task determines the voltage amplitude so that the voltage amplitude decreases as the absolute value of the phase difference decreases, and that a minimum value of the voltage amplitude is larger than a minimum value of the voltage amplitude in a case the value indicating the temperature environment is smaller than the predetermined value.

14. The driving control apparatus according to claim 1, wherein the second determining task determines the voltage amplitude according to a humidity environment.

15. The driving control apparatus according to claim 14, wherein when a value indicating the humidity environment is smaller than a predetermined value, the second determining task determines the voltage amplitude so that the voltage amplitude decreases as the absolute value of the phase difference decreases, and wherein when the value indicating the humidity environment is larger than the predetermined value, the second determining task determines the voltage amplitude so that the voltage amplitude decreases as the absolute value of the phase difference decreases, and that a minimum value of the voltage amplitude is larger than a minimum value of the voltage amplitude in a case where the value indicating the humidity environment is smaller than the predetermined value.

16. A driving control system comprising:
an actuator configured to relatively move a vibrator and a contact body contacting the vibrator, the vibrator being made to generate vibration by applying a first signal and a second signal having a phase difference, the driving control apparatus; and
at least one processor or circuit configured to execute a plurality of tasks including:
  a first determining task configured to determine the phase difference; and
  a second determining task configured to determine a voltage amplitude of power supplied to the actuator so that the voltage amplitude decreases as an absolute value of the phase difference decreases.

17. A lens apparatus comprising:
a driving control system according to claim 16; and
an optical unit driven by the driving control system.

18. A driving control method which controls an actuator that relatively moves a vibrator and a contact body contacting the vibrator, the vibrator being made to generate vibration by applying a first signal and a second signal having a phase difference, the driving control method comprising steps of:
  determining the phase difference; and
  determining a voltage amplitude of power supplied to the actuator so that the voltage amplitude decreases as an absolute value of the phase difference decreases.

19. A non-transitory computer-readable storage medium storing a computer program that causes a computer to execute each task of the driving control apparatus according to claim 1.

* * * * *